US012734990B2

(12) United States Patent
Wang

(10) Patent No.: US 12,734,990 B2
(45) Date of Patent: Sep. 15, 2026

(54) PROTECTION REINFORCING DEVICE OF A MULTI-POINT SEAT BELT SYSTEM FOR A VEHICLE

(71) Applicant: HORNLING INDUSTRIAL INC., Tainan City (TW)

(72) Inventor: Liang-Hsiung Wang, Tainan City (TW)

(73) Assignee: HORNLING INDUSTRIAL INC., Tainan City (CN)

( * ) Notice: Subject to any disclaimer, the term of this patent is extended or adjusted under 35 U.S.C. 154(b) by 119 days.

(21) Appl. No.: 18/772,502

(22) Filed: Jul. 15, 2024

(65) Prior Publication Data

US 2025/0033594 A1 Jan. 30, 2025

(30) Foreign Application Priority Data

Jul. 24, 2023 (TW) ................................ 112127614

(51) Int. Cl.
*B60R 22/14* (2006.01)
*A44B 11/00* (2006.01)
(Continued)

(52) U.S. Cl.
CPC ............ *B60R 22/14* (2013.01); *A44B 11/006* (2013.01); *A44B 11/2511* (2013.01);
(Continued)

(58) Field of Classification Search
CPC ............ A62B 35/0006; A44B 11/2511; A44B 11/2553; B60N 2/2816; B60N 2/2812;
(Continued)

(56) References Cited

U.S. PATENT DOCUMENTS 4,923,147 A 5/1990 Adams et al.
5,364,169 A 11/1994 Collins et al.
(Continued)

FOREIGN PATENT DOCUMENTS

CN 104129356 11/2014
CN 205131181 U 4/2016
(Continued)

*Primary Examiner* — Timothy J Brindley
(74) *Attorney, Agent, or Firm* — RABIN & BERDO, P.C.

(57) ABSTRACT

A protection reinforcing device for a multi-point seat belt system in a vehicle is connected between two webbings of the multi-point seat belt system on the vehicle seat, and includes two webbing adjustment buckles and a connecting buckle assembly detachably connected between the two webbing adjustment buckles. The two webbing adjustment buckles are mounted respectively on the webbings and can be adjusted in height position and positioned. The first webbing buckle and the second webbing buckle of the connecting buckle assembly are movably connected to the curved guiding sections of the buckle connection of the two webbing adjustment buckles, respectively. When the first webbing buckle and the second webbing buckle are in the unlocked state, they naturally rotate and hang down on the front side of the webbing by gravity at the curved guiding sections of the webbing adjustment buckle.

10 Claims, 8 Drawing Sheets

(51) Int. Cl.

| | |
|---|---|
| ***A44B 11/25*** | (2006.01) |
| ***B60R 22/00*** | (2006.01) |
| *B60R 22/02* | (2006.01) |
| *B60R 22/18* | (2006.01) |

(52) U.S. Cl.
CPC ..... *A44B 11/2553* (2013.01); *B60R 2022/027* (2013.01); *B60R 2022/1812* (2013.01)

(58) Field of Classification Search
CPC ...... B60R 2022/027; B60R 2022/1812; B60R 22/14
See application file for complete search history.

(56) References Cited

U.S. PATENT DOCUMENTS

| | | | | |
|---|---|---|---|---|
| 5,380,067 | A * | 1/1995 | Turvill | A44B 11/266 24/615 |
| 5,529,381 | A | 6/1996 | Zhao et al. | |
| 6,871,876 | B2 * | 3/2005 | Xu | A44B 11/2553 280/801.1 |
| 7,832,770 | B2 * | 11/2010 | Bradley | B60R 22/00 280/808 |
| 7,922,195 | B2 * | 4/2011 | Nezaki | B60R 21/18 280/808 |
| 8,333,433 | B2 * | 12/2012 | Friedman | B60R 22/36 24/615 |
| 9,840,225 | B2 * | 12/2017 | Cobb | A44B 11/2557 |
| 10,099,651 | B2 * | 10/2018 | Bredeson | B60R 22/14 |
| 11,440,444 | B2 * | 9/2022 | Shahbandar | B60N 2/2842 |
| 11,498,460 | B1 * | 11/2022 | Rumler | B60N 2/3084 |
| 11,571,047 | B2 * | 2/2023 | Ziv | A44B 11/2561 |
| 11,845,395 | B2 * | 12/2023 | Bittner | B60R 22/02 |
| 2013/0187421 | A1 * | 7/2013 | Foye | B60R 22/105 297/232 |
| 2018/0022312 | A1 | 1/2018 | Roychoudhury | |
| 2020/0290555 | A1 * | 9/2020 | Wang | B60R 22/02 |
| 2021/0206339 | A1 | 7/2021 | Bittner et al. | |
| 2022/0219640 | A1 | 7/2022 | Bittner et al. | |
| 2022/0219641 | A1 | 7/2022 | Bittner et al. | |
| 2023/0226994 | A1 | 7/2023 | Fumarola et al. | |
| 2024/0373988 | A1 * | 11/2024 | Melnikova | A44B 11/2569 |
| 2025/0108774 | A1 * | 4/2025 | Wu | B60R 22/023 |

FOREIGN PATENT DOCUMENTS

| | | |
|---|---|---|
| DE | 102005016984 | 12/2005 |
| JP | 2005329876 | 12/2005 |
| JP | 2020147274 | 9/2020 |
| TW | 202033392 | 9/2020 |

* cited by examiner

PROTECTION REINFORCING DEVICE OF A MULTI-POINT SEAT BELT SYSTEM FOR A VEHICLE

BACKGROUND OF THE INVENTION

1. Field of the Invention

The present invention relates to a safety belt system, particularly a protection reinforcing device used in multi-point seat belt systems applied to seats of various types of transportation vehicles with four or more fixed points. This device enhances structural reinforcement and safety protection.

2. Description of the Prior Arts

Vehicles such as off-road vehicles, racing cars, and tanks require high levels of safety. Therefore, the seat belts installed on the seats of these vehicles are mainly designed as four-point, five-point, six-point, or seven-point seat belt systems. Thereby the user's body can be securely fixed to the seat via multiple dispersed anchor points. When encountering sudden external forces, the multi-point seat belt system provides the user with effective safety protection by restraining their movement and providing stability.

In various known multi-point seat belt systems used in vehicles, take the four-point seat belt system for example: two webbings connected to the retractor are wrapped around the user's body on the left and right sides from the upper end of the seat back. The ends of the two webbings are respectively connected to the fixed points on the left and right sides of the seat cushion. The seat buckles and tongues connected to each one of the two webbings are locked to each other to consist of a seat buckle assembly located at the front side of the user's abdomen, thereby providing safety protection with four positioning points on the user's body. The five-point, six-point, and seven-point seat belt systems are based on the four-point seat belt system by adding assisting webbings connected to the seat buckle assembly, offering safety protection with more positioning points on the user's body.

Although the aforementioned multi-point seat belt systems used in vehicles provide safety protection with at least four positioning points on the user's body adopting the two webbings connected to the retractor, the retractors that provide the retracting force for the two webbings are typically mounted on the top or back of the seat back. The seat buckle assemblies, which are connected between the two webbings, are positioned in front of the user's abdomen. As a result, there is a relatively long distance between the connection point of the webbing on the seat buckle assembly, located at the user's abdominal position and the user's shoulders or the seat back. During emergency deceleration or braking of the vehicle, the retractor retracts the webbing around the user's body on the seat, restraining the user to the seat. However, due to the inertia forces, the user's upper body moves forward, causing the upper body to slide over the webbings on the left and right sides and tilt forward between the two webbings. Therefore, the conventional multi-point seat belt systems have shortcomings in their protective performance and require further improvement.

Additionally, the seat assembly of a motor vehicle, disclosed in US Patent Publications US 2021/0206339, US 2022/0219640, and US 2022/219641, published on Jul. 8, 2021, includes a connecting belt detachably added between the left and right webbings of the multi-point seat belt system on the seat. One end of the connecting belt is fixedly connected to one webbing, while the other webbing is equipped with a buckle. The other end of the connecting belt can be fastened on or detached from the buckle on the other webbing. In this manner, during emergency deceleration or braking of the vehicle, the combination of the connecting belt between the two webbings wrapped around the user's body on the left and right sides limits the distance between the two webbings. The connecting belt can be positioned horizontally to block the user's chest, preventing the user's upper body from sliding forward between the two webbings due to inertia forces.

Although the aforementioned multi-point seat belt system installed in the seat of a motor vehicle enhances the safety of the multi-point seat belt system by using the detachable connecting belt between the left and right webbings, the fixed end of the connecting strap is connected to one webbing, and the other end of the connecting belt can be fastened on and detached from the buckle on the other webbing. This connecting belt does not allow the user to adjust the height position according to different body shapes. Furthermore, when the other end of the connecting belt is detached from the buckle on the other webbing, the connecting belt, being fixed to one webbing at one end, may hang down, but it still protrudes on one side of the webbing in the multi-point seat belt system. This connecting belt tends to interfere with the user's movements on the seat.

SUMMARY OF THE INVENTION

The main objective of the present invention is to provide a protection reinforcing device of a multi-point seat belt system for a vehicle to improve the multi-point seat belt system in terms of protective performance and convenience in use.

To achieve the aforementioned objectives, the present invention provides a protection reinforcing device of a multi-point seat belt system for a vehicle configured to be mounted in the multi-point seat belt system of a vehicle seat. The multi-point seat belt system has two webbings configured to wrap and secure both sides of a user's body on the vehicle seat. The protection reinforcing device is capable of connecting the two webbings, and includes two webbing adjustment buckles and a connecting buckle assembly.

The two webbing adjustment buckles are configured to be mounted on the two webbings and adjust height positions and positioning on the webbings, respectively. A bottom end of each one of the webbing adjustment buckles has a buckle connection located in front of a respective one of the webbings. The buckle connection forms a curved guiding section located on at least one side of the buckle connection.

The connecting buckle assembly is detachably connected between the two webbing adjustment buckles, and includes a first webbing buckle and a second webbing buckle. The first webbing buckle is capable of locking or releasing the second webbing buckle. The first webbing buckle and the second webbing buckle are movably and rotatably connected to the curved guiding section; thereby the protection reinforcing device is connected between the two webbings and horizontally positioned on a front side of the user's body by locking between the first webbing buckle and the second webbing buckle.

Wherein when the first webbing buckle and the second webbing buckle are unlocked, the first webbing buckle and the second webbing buckle are capable of naturally rotating and hanging down on the curved guiding section to a front side of the webbings by gravity, respectively.

By utilizing the aforementioned structure of the protection reinforcing device, when applied to the multi-point seat belt system of the seats of vehicles, the protection reinforcing device not only provides safety protection by having the two webbings connected to the retractor wrapped around the user's body on the left and right sides, but also enhances at least the following functionalities of the multi-point seat belt system:

1. Auxiliary safety protection and reinforcement to the multi-point seat belt system: The protection reinforcing device utilizes the first webbing buckle and the second webbing buckle, which are respectively connected to the left and right webbings of the multi-point seat belt system by the two webbing adjustment buckles to enable the first webbing buckle and the second webbing buckle to be horizontally connected between the two webbings, providing reinforcement to the webbings. Moreover, the first webbing buckle and the second webbing buckle, when connected, are positioned horizontally in front of the user's chest. During emergency deceleration or braking of the vehicle, the retractor retracts the two webbings wrapped around the user's body on the seat. Due to the inertia forces, the user's upper body tends to move forward. However, the protection reinforcing device limits the distance between the two webbings and blocks them horizontally in front of the user's chest, preventing the user's upper body from sliding over the webbings on the left and right sides or tilting forward between the two webbings. Therefore, the protection reinforcing device of the present in invention can indeed provide excellent auxiliary safety protection and reinforcement in the multi-point seat belt system.
2. Height adjustment: As mentioned above, the protection reinforcing device of the present invention utilizes the first webbing buckle and the second webbing buckle, which are respectively connected to the left and right webbings of the multi-point seat belt system through the two webbing adjustment buckles. By moving and positioning the two webbing adjustment buckles on the webbings, the user can adjust the height positions of the first webbing buckle and the second webbing buckle on the webbings according to their body shape. This allows the protection reinforcing device to provide auxiliary safety protection in the appropriate position that suits the user's body shape on the seat.
3. Reducing interference with user movements: When the first webbing buckle and the second webbing buckle are unlocked from the locked state, they naturally rotate and hang down by gravity on the front side of the webbing at the buckle connections of the first adjustment buckle and the second adjustment buckle respectively. The first webbing buckle and the second webbing buckle are located respectively in front of the two webbings, reducing interference with user movements.

The protection reinforcing device according to the present invention further includes a curved guiding section formed at least on one side of the buckle connection of the two webbing adjustment buckles positioned on the two webbings. The first webbing buckle and the second webbing buckle are movably connected to the curved guiding section of the two webbing adjustment buckles, respectively, and naturally rotate and hang down by gravity. The curved shape of the curved guiding section reduces interference during the rotation of the first webbing buckle and the second webbing buckle and enhances the smoothness of natural rotation and hanging down by gravity.

The protection reinforcing device according to the present invention further includes a positioning section in each webbing adjustment buckle. The positioning section includes a frame and a crossbar within the frame, allowing the webbing to pass through the frame and wrap around the crossbar evenly. The top end of the buckle connection is connected to the bottom end of the frame. Thereby the user can easily adjust the height position of the first webbing buckle and the second webbing buckle on the webbing while maintaining the flatness of the webbing.

The protection reinforcing device according to the present invention further includes a gap between the buckle connection and the positioning section, wherein the buckle connection is located in front of the webbing with a step between the buckle connection and the webbing. This provides an appropriate space for the movement of the first webbing buckle and the second webbing buckle. The buckle connection forms a circular hole, and the lower outer peripheral surface of the buckle connection forms a curved surface. When the first webbing buckle and the second webbing buckle are movably connected to the buckle connection at the bottom of the webbing adjustment buckle, this structure enhances the smooth rotation of the first webbing buckle and the second webbing buckle at the buckle connection and reduces interference between the webbing adjustment buckle and the webbing during rotation.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
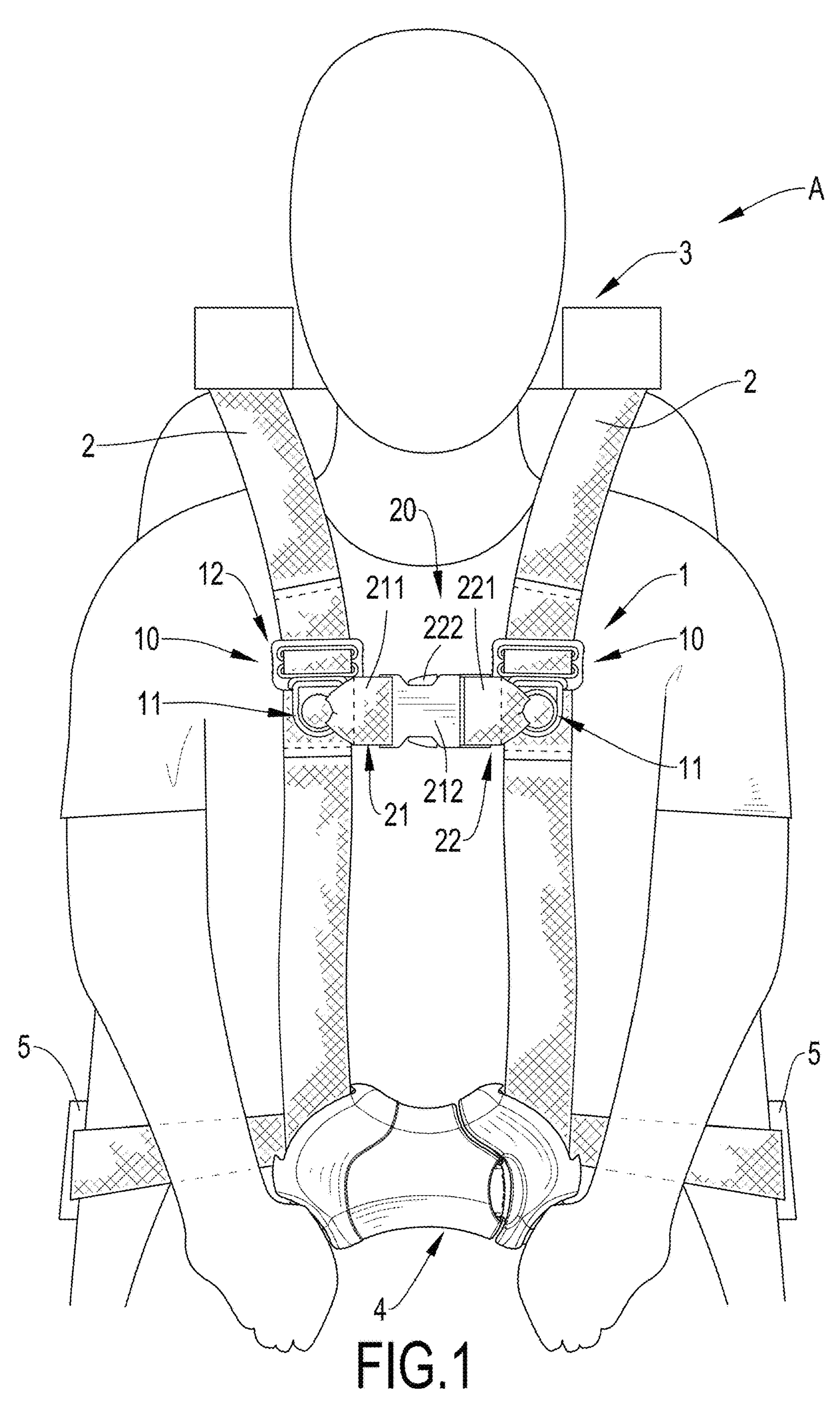
FIG. 1 is a schematic view of an embodiment of the protection reinforcing device, applied to a four-point seat belt system on a seat of a vehicle in accordance with the present invention.
Figure 3:
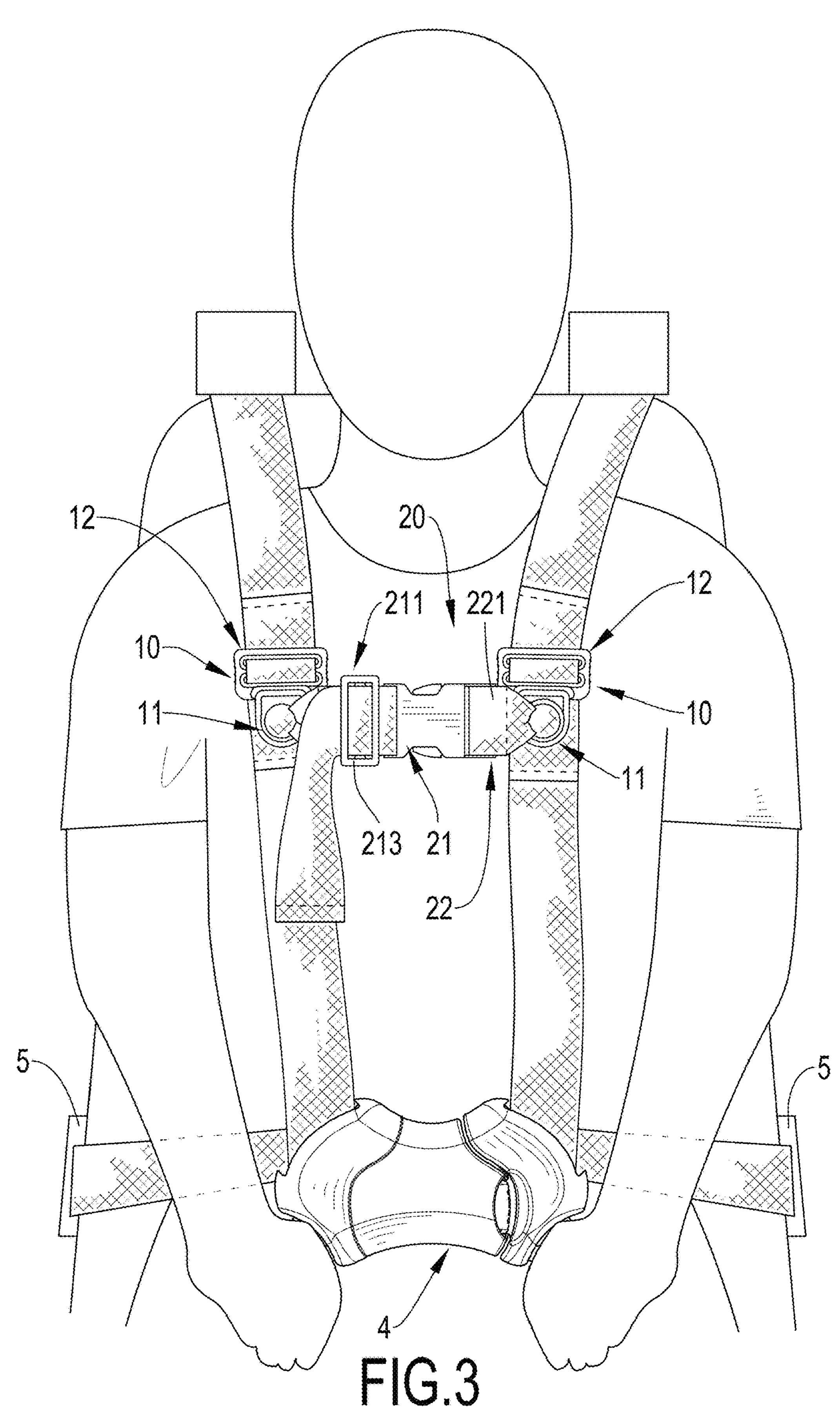
FIG. 3 is a schematic view of another embodiment of the protection reinforcing device, applied to a four-point seat belt system on a seat of a vehicle in accordance with the present invention.
Figure 4:
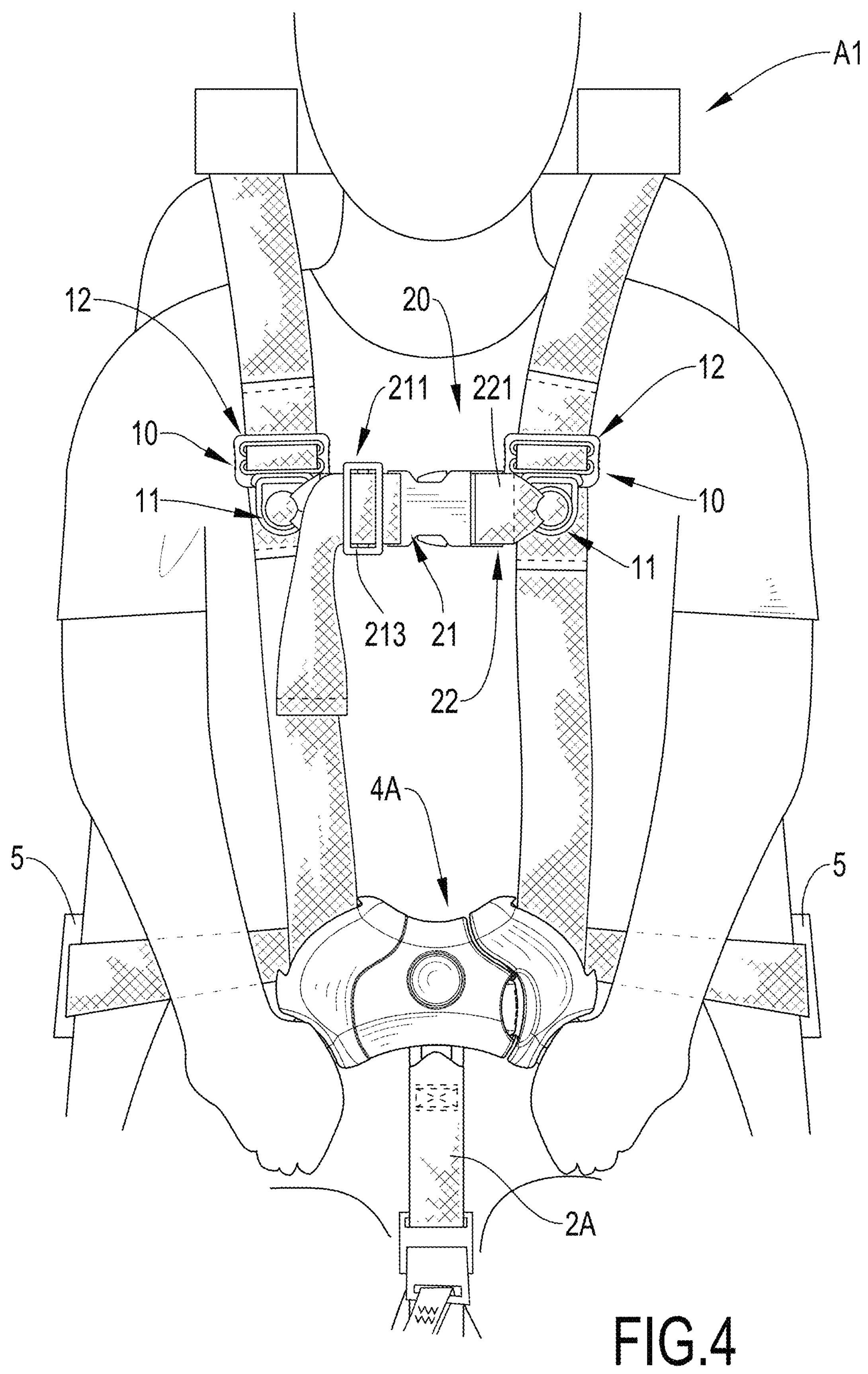
FIG. 4 is a schematic view of an embodiment of the protection reinforcing device, applied to a five-point seat belt system on a seat of a vehicle in accordance with the present invention.

With reference to FIGS. 1, 3, and 4, there are several embodiments in accordance with the protection reinforcing device 1 of a multi-point seat belt system for a vehicle. A protection reinforcing device 1 is used for a multi-point seat belt system on the seat of the vehicle. Wherein the multi-point seat belt system presented in FIGS. 1 and 3 is a four-point seat belt system A, and the multi-point seat belt system presented in FIG. 4 is a five-point seat belt system A1. The multi-point seat belt system can also be a six-point seat belt system, a seven-point seat belt system, etc., not restricted to the four-, five-point seat belt systems.

With reference to FIGS. 1, 3, and 4, the four-point seat belt system A and the five-point seat belt system A1 each include two webbings 2, one or two retractors 3, and a seat buckle assembly 4/4A. The two webbings 2 are located at the right side and left side of the seat. The retractor 3 can be installed on the top, back, or rear of the seat back. The two webbings 2 each have one respective end, said two ends commonly connected to one retractor 3, or the two webbings 2 each have one respective end, said two ends connected respectively to two retractors 3. The two webbings 2 each have another respective end, said two another ends combined respectively with two connecting mechanisms 5 mounted at the right side and the left side of the seat.

Figure 9:
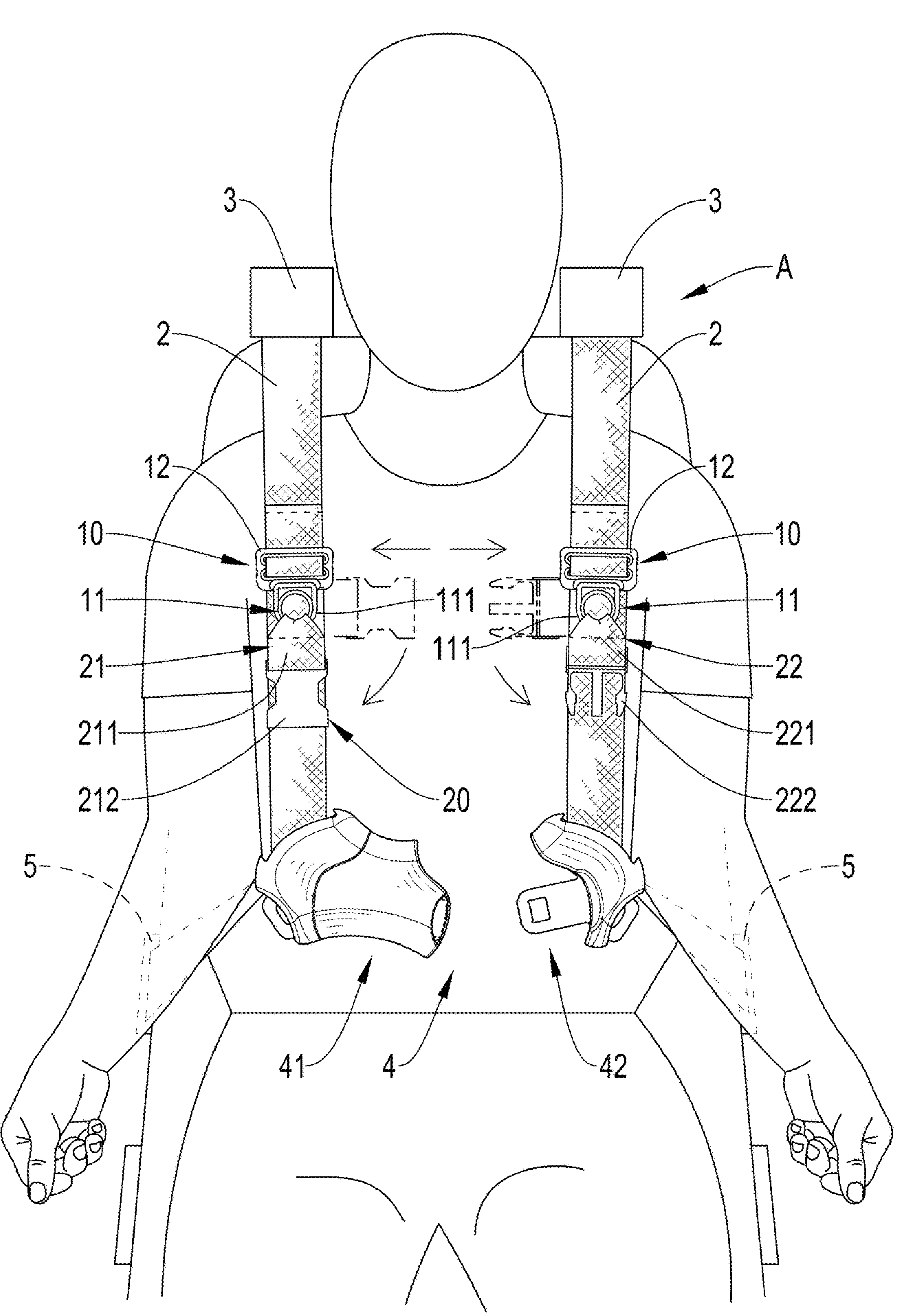
FIG. 9 is a schematic view of the embodiment of the protection reinforcing device shown in FIG. 1 applied to a four-point seat belt system on a seat of a vehicle, with the protection reinforcing device in a state where the first webbing buckle and the second webbing buckle are unlocked.

With reference to FIGS. 1 and 9, when the multi-point seat belt system is the four-point seat belt system A, the seat buckle assembly 4 includes a seat buckle 41 and a tongue 42. The seat buckle 41 and the tongue 42 are movably mounted on the two webbings 2, respectively. The tongue 42 can be locked on or unlocked from the seat buckle 41. When a user sits on the seat of the vehicle, the two webbings 2 are capable of wrapping the right side and the left side in the front of the user's body. After the seat buckle 41 and the tongue 42 are locked together, the seat buckle assembly 4 is located in front of the user's abdomen, and thereby the two webbings 2 are wrapped on the user's body and consist of four positioning points.

With reference to FIG. 4, as for the five-point seat belt system A1 or the six-point, seven-point seat belt systems, they are based on the four-point seat belt system A (as shown in FIGS. 1 and 3), adding at least one assisting webbing 2A connected to the seat buckle assembly 4A. The structure of the seat buckle assembly 4A is conventional. Wherein the seat buckle assembly 4A includes a seat buckle and two tongues. The seat buckle is mounted on the assisting webbing 2A. The two tongues are movably mounted on the two webbings 2, respectively. The two tongues can be locked on or unlocked from the seat buckle. When a user sits on the seat of the vehicle, the two webbings 2 are capable of wrapping the right side and the left side in the front of the user's body. After the seat buckle and the two tongues are locked together, the seat buckle assembly 4A is located in front of the user's abdomen, and thereby the two webbings 2, combined with the assisting webbing 2A, are wrapped on the user's body, accomplishing the safety protection constituted by more positioning points.

With reference to FIGS. 1 to 4, the protection reinforcing device 1 can be connected between the two webbings 2 of the multi-point seat belt system A/A1, and includes two webbing adjustment buckles 10 and a connecting buckle assembly 20. The specific structure is detailed as follows.

Figure 2:
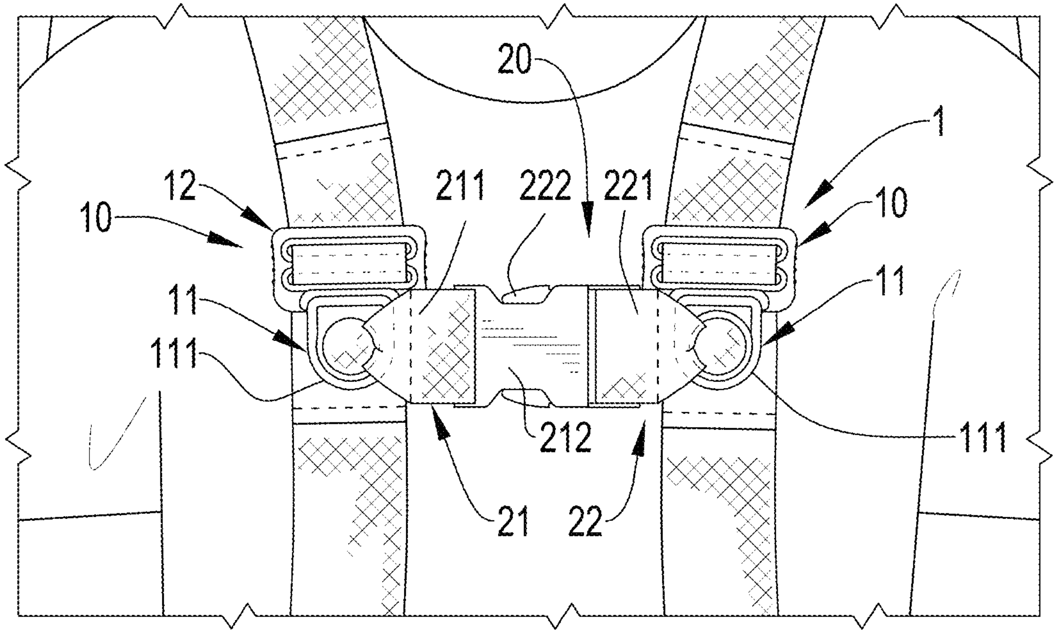
FIG. 2 is an enlarged partial view showing the embodiment of the protection reinforcing device shown in FIG. 1, connected between the left and right webbings of the four-point seat belt system in accordance with the present invention.
Figure 5:
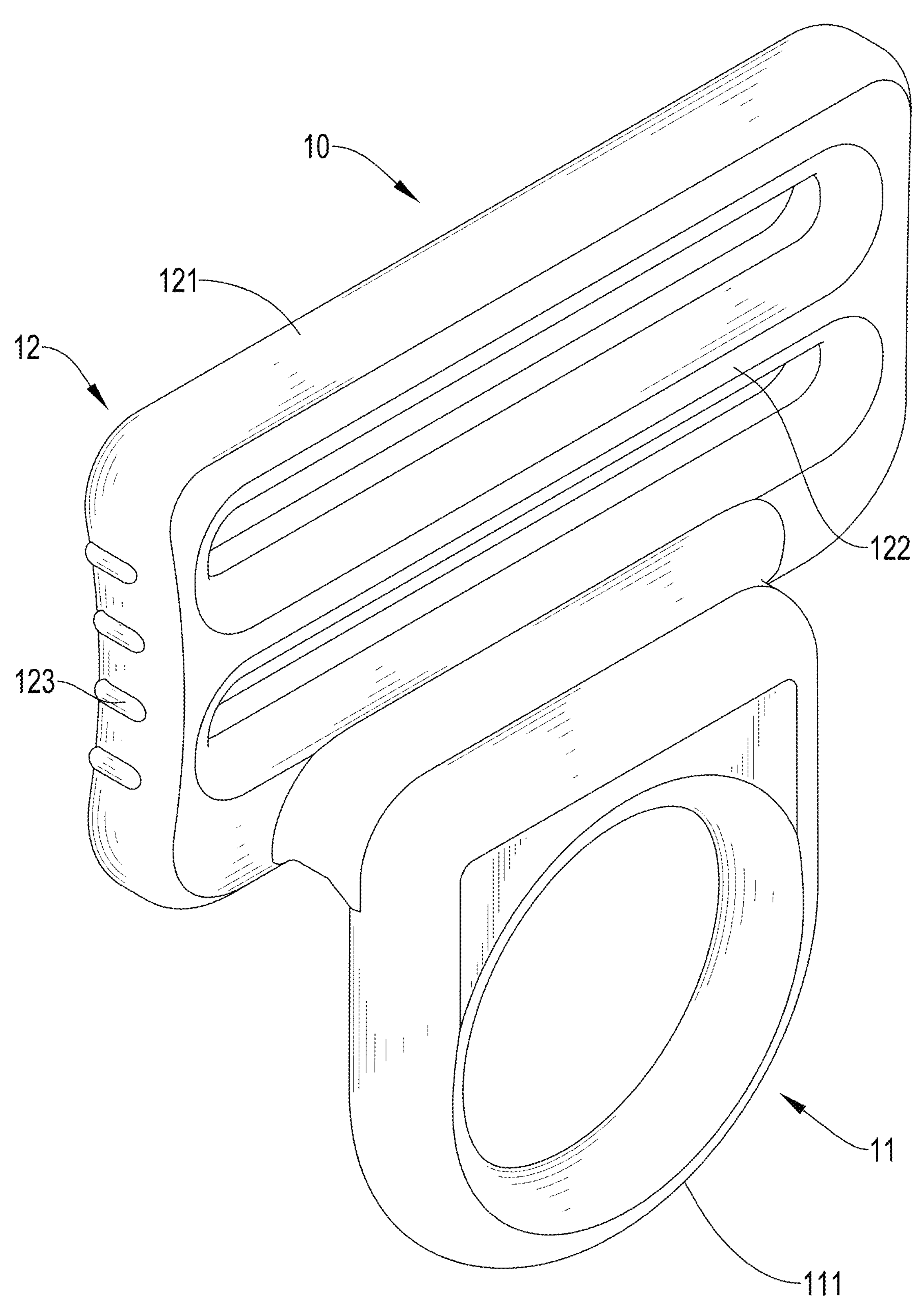
FIG. 5 is a perspective view of the webbing adjustment buckle in the embodiments of the protection reinforcing device shown in FIGS. 1 to 4 in accordance with the present invention.

With reference to FIGS. 1 to 5, the two webbing adjustment buckles 10 can be mounted on the two webbings 2 and adjust height position and positioning. A bottom end of each one of the webbing adjustment buckles 10 has a buckle connection 11. The buckle connection 11 is located in front of the webbing 2. A gap is formed between the buckle connection 11 and the webbing 2. With reference to FIGS. 2 and 5, the buckle connection 11 of the two webbing adjustment buckles 10 forms a curved guiding section 111 located on at least one side of the buckle connection 11.

With reference to FIGS. 1 to 5, in this embodiment, each one of the webbing adjustment buckles 10 includes a positioning section 12. The positioning section 12 includes a frame 121 and a crossbar 122 within the frame. A width of an interior space of the frame 121 and a length of the crossbar 122 match a width of the webbing 2; therefore, the webbing adjustment buckle 10 can be mounted on the webbing 2 via the positioning section 12. The webbing 2 is capable of passing evenly through the frame 121 and winding on the crossbar 122, thereby getting positioned by friction resistance between the webbing 2 and the positioning section 12. When releasing the webbing 2 from the positioning section 12, the webbing adjustment buckle 10 can move along the lengthwise direction of the webbing 2 (vertical direction) to adjust the height position freely. In a preferred embodiment, the left and right sides of the frame form a concave-and-convex anti-slip section 123. The anti-slip section 123 facilitates the user to hold the frame 121 of the positioning section 12 to adjust the height position of the webbing adjustment buckle 10 on the webbing 2.

Figure 6:
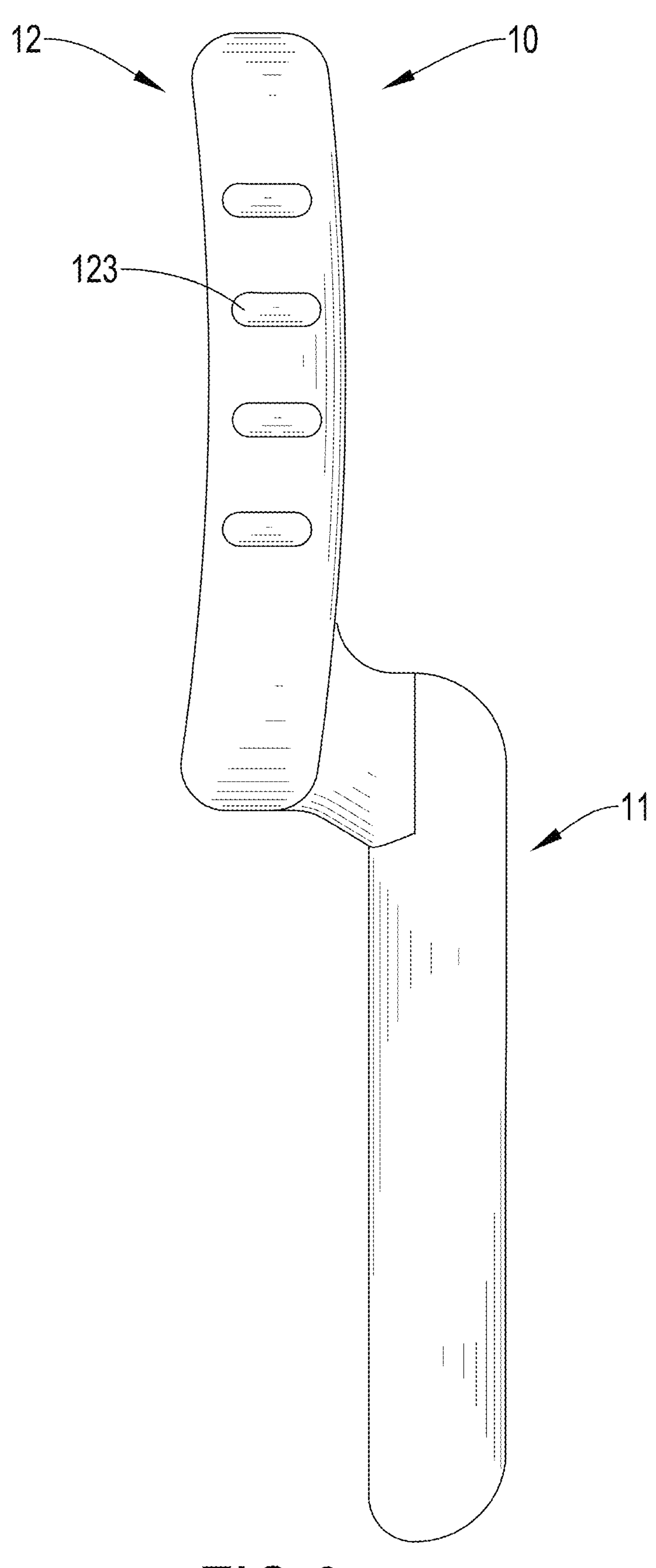
FIG. 6 is a side schematic view of the webbing adjustment buckle in the embodiments of the protection reinforcing device shown in FIGS. 1 to 4.

With reference to FIGS. 5 and 6, the top end of the buckle connection 11 is connected to the bottom end of the frame 121. A step is formed between the buckle connection 11 and the positioning section 12. Thereby the buckle connection 11 is located in front of the webbing 2, and a gap is between the buckle connection 11 and the webbing 2.

Figure 7:
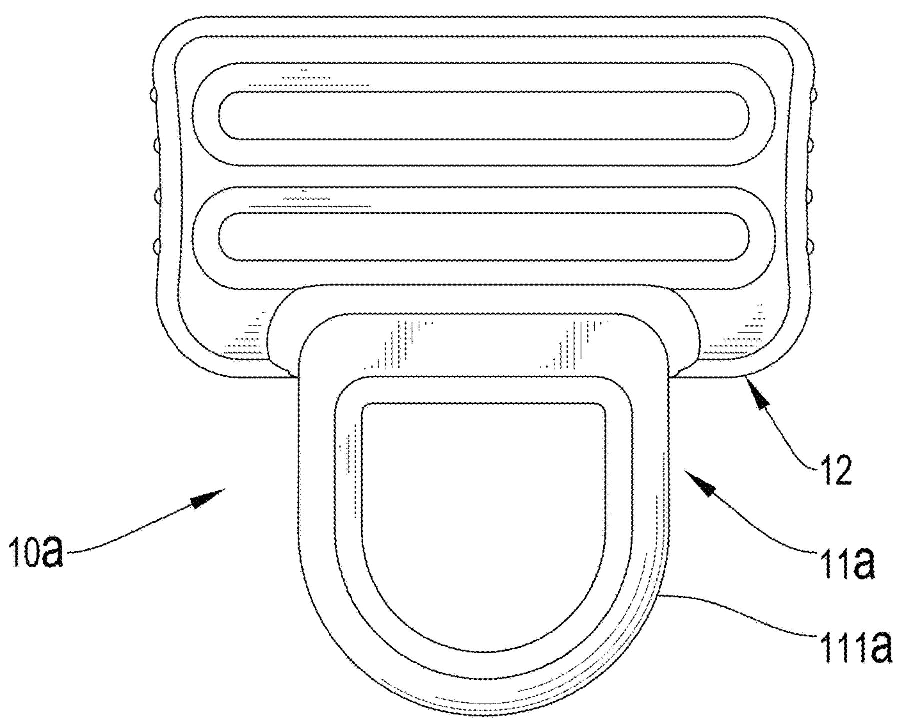
FIG. 7 is a front schematic view of another embodiment of the webbing adjustment buckle in the embodiments of the protection reinforcing device in accordance with the present invention.
Figure 8:
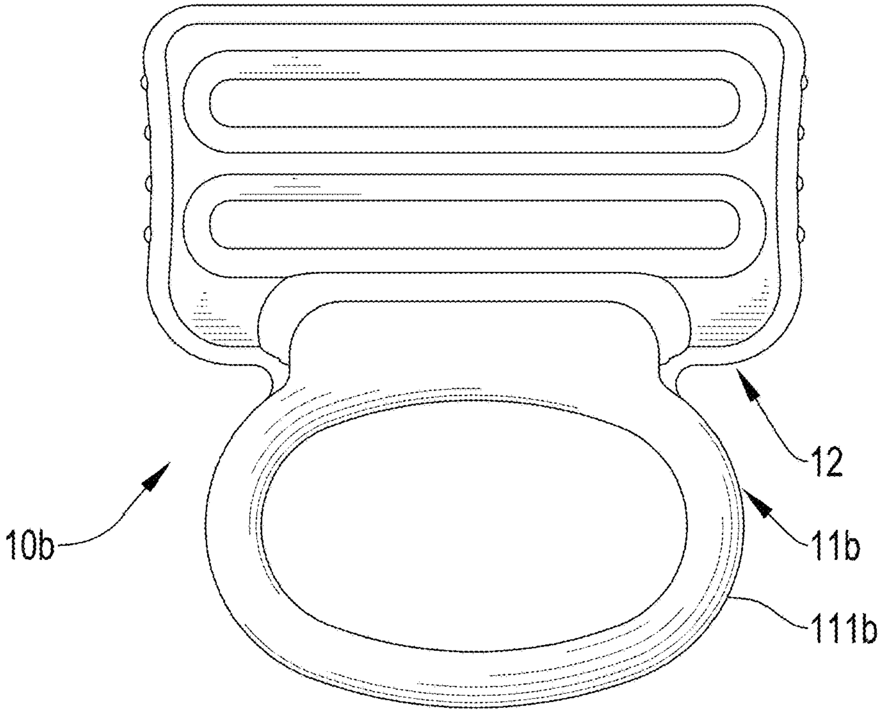
FIG. 8 is a front schematic view of another embodiment of the webbing adjustment buckle in the embodiments of the protection reinforcing device in accordance with the present invention.

In the embodiments with reference to FIGS. 5, 7, and 8, the lower part of the buckle connection 11 is an elliptical ring or semicircular ring. The buckle connection 11 forms a circular hole in the middle, a hole that is in a composite shape which is semicircular at the lower half and rectangular at the upper half, or an elliptical ring. The buckle connection 11 forms the curved guiding section 111 at the lower half part. The above embodiments are only disclosed to illustrate several specific feasible configurations of the buckle connection 11, but they are not limited to those embodiments.

With reference to FIGS. 1 to 4 and 9, the connecting buckle assembly 20 includes a first webbing buckle 21 and a second webbing buckle 22. The first webbing buckle 21 is capable of being locked with or released from the second webbing buckle 22. The first webbing buckle 21 and the second webbing buckle 22 are movably connected to the buckle connection 11 of the two webbing adjustment buckles 10, respectively, and thereby the protection reinforcing device 1 can be connected between the two webbings 2. With reference to FIG. 9, when the first webbing buckle 21 and the second webbing buckle 22 are unlocked, the first webbing buckle 21 and the second webbing buckle 22 are capable of naturally rotating and hanging down on the buckle connection 11 to a front side of the webbing 2 by gravity, respectively.

With reference to FIGS. 1 to 4 and 9, the first webbing buckle 21 and the second webbing buckle 22 are movably connected to the curved guiding section 111 of the two webbing adjustment buckles 10, respectively. The first webbing buckle 21 and the second webbing buckle 22 are capable of naturally rotating and hanging down on the curved guiding section 111 to a front side of the webbing 2 by gravity, respectively, and reduce interference when the first webbing buckle 21 rotates with the second webbing buckle 22 and enhance smoothness when the first webbing buckle 21 and the second webbing buckle 22 naturally rotate and sag on the curved guiding section 111 by gravity by the curved shape of the curved guiding section 111.

With reference to FIGS. 1, 2, 4, and 9, the first webbing buckle 21 has a first connecting webbing 211 and a first buckle 212. The first buckle 212 is connected to one end of the first connecting webbing 211. Another end of the first connecting webbing 211 is wrapped around one of the buckle connections 11, and thereby the first webbing buckle 21 can rotate on the buckle connection 11. The second webbing buckle 22 has a second connecting webbing 221 and a second buckle 222. The second buckle 222 is connected to one end of the second connecting webbing 221. Another end of the second connecting webbing 221 is wrapped around another one of the buckle connections 11, and thereby the second webbing buckle 22 can rotate on the buckle connection 11. The first buckle 212 and the second buckle 222 can be respectively a male buckle and a female buckle configured to be locked together. The male buckle and the female buckle can be selected from any known product, and structure thereof would be omitted from description.

With reference to FIGS. 1, 2, and 4, in the first buckle 21 and the second buckle 22, the first connecting webbing 211 and the second connecting webbing 221 both are fixed-length belts, or the first connecting webbing 211 and the second connecting webbing 221 are each a length-adjustable belt having a position adjustment component 213 and a belt body mounted in the position adjustment component 213. Alternatively, with reference to FIG. 3, one of the first connecting webbing 211 and the second connecting webbing 221 is a fixed-length belt; the other one of the first connecting webbing 211 and the second connecting webbing 221 is a length-adjustable belt having a position adjustment component 213 and a belt body mounted in the position adjustment component 213. Wherein, with one or both of the first connecting webbing 211 and the second connecting webbing 221 being length-adjustable, the user can adjust the length of the connecting buckle assembly 20 according to the user's body shape. With reference to FIGS. 1, 2, 4, and 9, when the protection reinforcing device 1 is applied to the multi-point seat belt system of the seat of the vehicle, taking the application to the four-point seat belt system A and the five-point seat belt system A1 as examples. When the user sits on the seat, the two webbings 2 connected to the retractor 3 are wrapped around both the right and left sides of the user's body, and the seat buckle 41 and the tongue 42 connected to the two webbings 2 are locked to each other, and thereby the seat buckle assembly 4/4A is located in front of the user's abdomen. After that, the first webbing buckle 21 and the second webbing buckle 22 are locked to each other and horizontally connected between the two webbings 2 to provide reinforcement between the two webbings 2.

The first webbing buckle 21 and the second webbing buckle 22 can be mounted on the two webbings 2 by the two webbing adjustment buckles 10, respectively, allowing the user to adjust the height position and the positioning of the two webbing adjustment buckles 10 on the two webbings 2 to fit the user's body shape. Therefore, the first webbing buckle 21 and the second webbing buckle 22 are locked to each other and transversally connected between the two webbings 2, and horizontally located in front of the user's abdomen to provide an auxiliary safety protection effect for the user. During emergency deceleration or braking of the vehicle, the retractor 3 retracts the two webbings 2 wrapped around the user's body on the seat. When the user on the seat moves forward because of inertia force, the user's upper body won't slide over the two webbings 2 at both right and left sides and tilt forward between the two webbings 2. Therefore, the protection reinforcing device 1 can provide excellent auxiliary safety protection and reinforcement in the multi-point seat belt system.

With reference to FIGS. 1, 2, and 9, when disengaging the first webbing buckle 21 and the second webbing buckle 22, the first webbing buckle 21 and the second webbing buckle 22 are capable of naturally rotating and hanging down respectively on the curved guiding section 111 to a front side of the webbing 2 by gravity to reduce interference with the user's movement.

Wherein, the protection reinforcing device 1 reduces interference when the first webbing buckle 21 rotates with the second webbing buckle 22 and enhances smoothness when the first webbing buckle 21 and the second webbing buckle 22 naturally rotate and sag on the curved guiding section 111 by gravity with the curved-shape of the curved guiding section 111.

In addition, the protection reinforcing device 1 utilizes a gap between the buckle connection 11 and the positioning section 12, the buckle connection 11 located in front of the webbing 12, and a step between the buckle connection 11 and the webbing 2 to provide an appropriate space for the movement of the first webbing buckle 21 and the second webbing buckle 22, respectively. Therefore, the protection reinforcing device 1 enhances smoothness when the first webbing buckle 21 and the second webbing buckle 22 rotate at the buckle connection 11, and reduces interference of the webbing adjustment buckle 10 and the webbing 2 with the first webbing buckle 21 and the second webbing buckle 22 when rotating.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A protection reinforcing device of a multi-point seat belt system for a vehicle, configured to be mounted in the multi-point seat belt system of a vehicle seat; the multi-point seat belt system having two webbings configured to wrap and secure both sides of a user's body on the vehicle seat; the protection reinforcing device being capable of connecting the two webbings, and comprising:

- two webbing adjustment buckles configured to be mounted on the two webbings and adjust height positions and positioning on the webbings, respectively; each one of the webbing adjustment buckles having:
  - a buckle connection disposed at a bottom end of said each webbing adjustment buckle and located in front of a respective one of the webbings and forming:
    - a curved guiding section located on at least one side of the buckle connection; and
  - a positioning section having:
    - a frame; and
    - a crossbar located within the frame;

wherein a width of an interior space of the frame and a length of the crossbar match a width of a corresponding one of the webbings;

thereby the corresponding webbing is capable of evenly passing through the frame and winding on the crossbar; a top end of the buckle connection is connected to a bottom end of the frame, and wherein a step is located between the buckle connection and the positioning section; the buckle connection is located in front of the corresponding webbing; a gap is formed between the buckle connection and the webbing, a connecting buckle assembly detachably connected between the two webbing adjustment buckles, and including:

a first webbing buckle; and a second webbing buckle; the first webbing buckle being capable of locking or releasing the second webbing buckle; the first webbing buckle and the second webbing buckle movably and rotatably connected to the curved guiding section; thereby the protection reinforcing device connected between the two webbings and horizontally positioned on a front side of the user's body by locking between the first webbing buckle and the second webbing buckle;

wherein when the first webbing buckle and the second webbing buckle are unlocked, the first webbing buckle and the second webbing buckle are capable of naturally rotating and hanging down on the curved guiding section to a front side of the webbings by gravity, respectively.

2. The protection reinforcing device as claimed in claim 1, wherein for each one of the webbing adjustment buckles, a right side surface and a left side surface of the frame each have a respective anti-slip section formed thereon.

3. The protection reinforcing device as claimed in claim 1, wherein:

the first webbing buckle has:

a first connecting webbing; one end of the first connecting webbing wound on one of the buckle connections; the first webbing buckle being capable of rotating on the buckle connection; and a first buckle connected to another end of the first connecting webbing;

the second webbing buckle has:

a second connecting webbing; one end of the second connecting webbing wound on another one of the buckle connections; the second webbing buckle being capable of rotating on the buckle connection; and a second buckle connected to another end of the second connecting webbing;

wherein the first buckle and the second buckle are respectively a male buckle and a female buckle configured to be locked together.

4. The protection reinforcing device as claimed in claim 2, wherein:

the first webbing buckle has:

a first connecting webbing; one end of the first connecting webbing wound on one of the buckle connections; the first webbing buckle being capable of rotating on the buckle connection; and a first buckle connected to another end of the first connecting webbing;

the second webbing buckle has:

a second connecting webbing; one end of the second connecting webbing wound on another one of the buckle connections; the second webbing buckle being capable of rotating on the buckle connection; and a second buckle connected to another end of the second connecting webbing;

wherein the first buckle and the second buckle are respectively a male buckle and a female buckle configured to be locked together.

5. The protection reinforcing device as claimed in claim 3, wherein the first connecting webbing and the second connecting webbing are fixed-length belts.

6. The protection reinforcing device as claimed in claim 4, wherein the first connecting webbing and the second connecting webbing are fixed-length belts.

7. The protection reinforcing device as claimed in claim 3, wherein the first connecting webbing and the second connecting webbing are length-adjustable belts and each have:

a belt body; and a position adjustment component mounted on the belt body.

8. The protection reinforcing device as claimed in claim 4, wherein the first connecting webbing and the second connecting webbing are length-adjustable belts and each have:

a belt body; and a position adjustment component mounted on the belt body.

9. The protection reinforcing device as claimed in claim 3, wherein one of the first connecting webbing and the second connecting webbing is a fixed-length belt; another one of the first connecting webbing and the second connecting webbing is a length-adjustable belt and has:

a belt body; and a position adjustment component mounted on the belt body.

10. The protection reinforcing device as claimed in claim 4, wherein one of the first connecting webbing and the second connecting webbing is a fixed-length belt; another one of the first connecting webbing and the second connecting webbing is a length-adjustable belt and has:

a belt body; and a position adjustment component mounted on the belt body.

* * * * *